Figure 1:
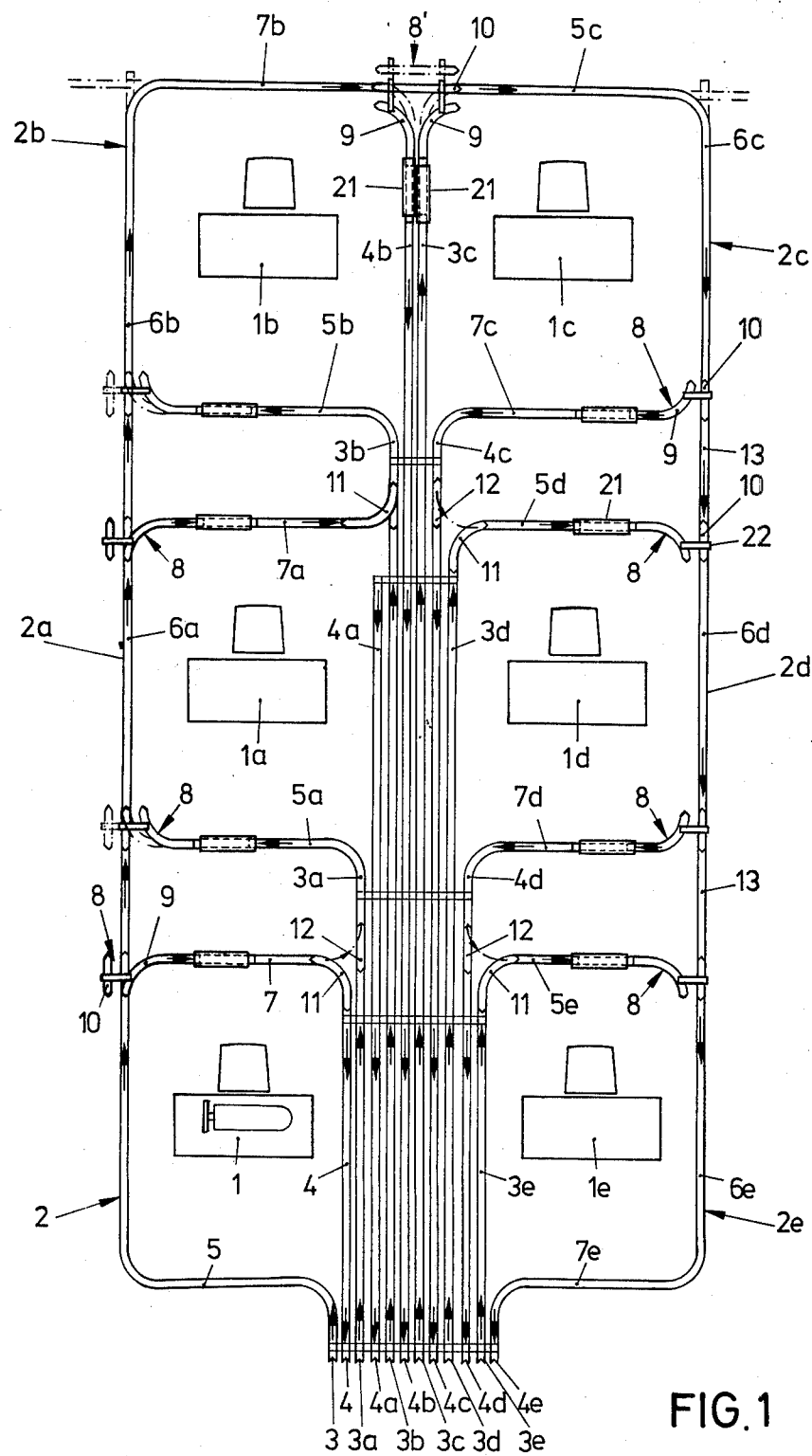

United States Patent [19]

Veith

[11] 4,265,178

[45] May 5, 1981

[54] CONVEYOR APPARATUS FOR INTRAPLANT CONVEYANCE

[75] Inventor: Gustav G. Veith, Laiming, Fed. Rep. of Germany

[73] Assignee: Gustav Georg Veith GmbH & Co. KG, Munich, Fed. Rep. of Germany

[21] Appl. No.: 86,263

[22] Filed: Oct. 18, 1979

[30] Foreign Application Priority Data

Oct. 20, 1978 [DE] Fed. Rep. of Germany ....... 2845799

[51] Int. Cl.³ .............................................. B61L 27/04
[52] U.S. Cl. .................................................. 104/88
[58] Field of Search ............................ 104/80, 88, 1 B

[56] References Cited

U.S. PATENT DOCUMENTS

| 3,977,513 | 8/1976 | Rushforth | 104/88 |
| 4,018,410 | 4/1977 | Renaux | 104/88 |

Primary Examiner—Richard A. Bertsch
Attorney, Agent, or Firm—James E. Nilles

[57] ABSTRACT

An overhead conveyor system for a plant having at least two work stations has a conveyor rail loop for each station, a feeder rail for each loop, extending toward the loop from a terminal zone, and a return rail for each loop, extending from the loop to the terminal zone. A bypass rail segment extends from one of said loops to the other, with its ends spaced from the feeder and return rails for those loops. Shiftable rail devices allow goods either to traverse all of said one loop or, as a selectable alternative, to traverse only a part of said one loop and move along the bypass segment directly into the other loop. Other shiftable rail devices allow goods that have traversed said one loop to move either to its return rail or to the feeder rail for said other loop. Various shiftable rail devices are disclosed.

4 Claims, 9 Drawing Figures

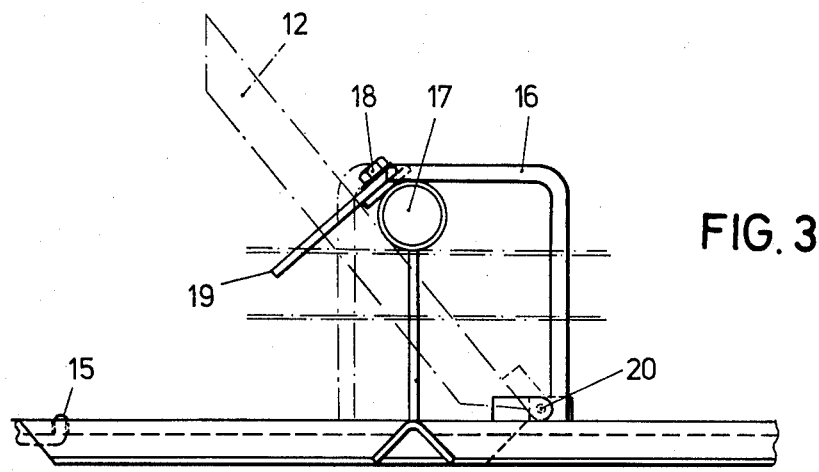
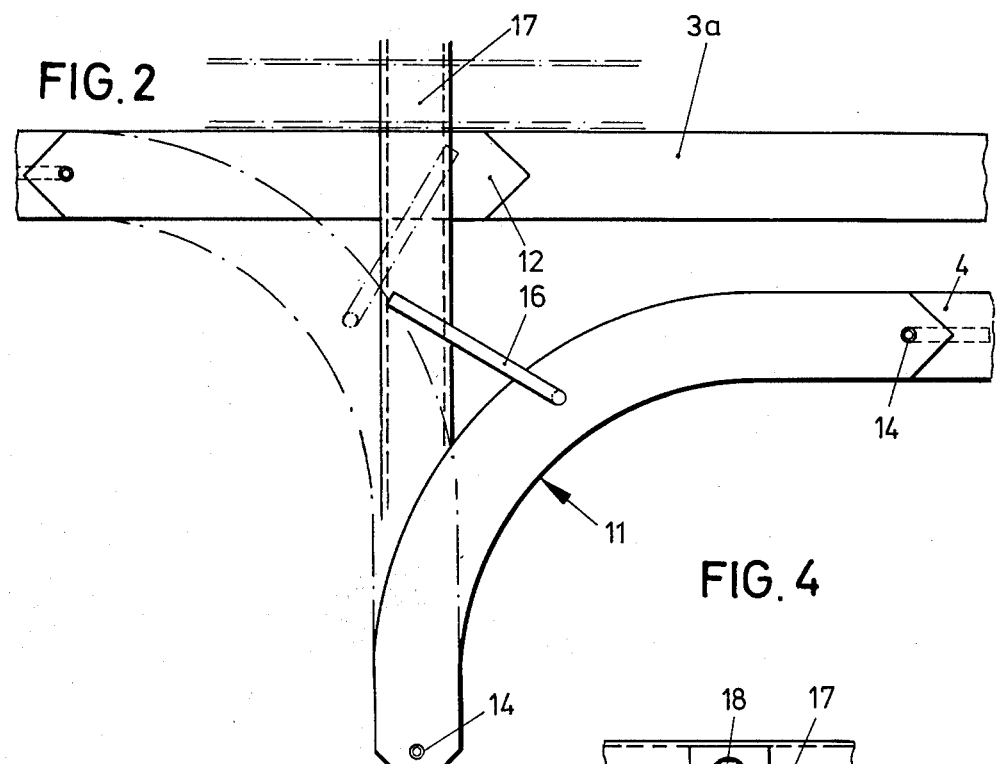
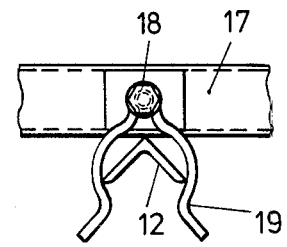

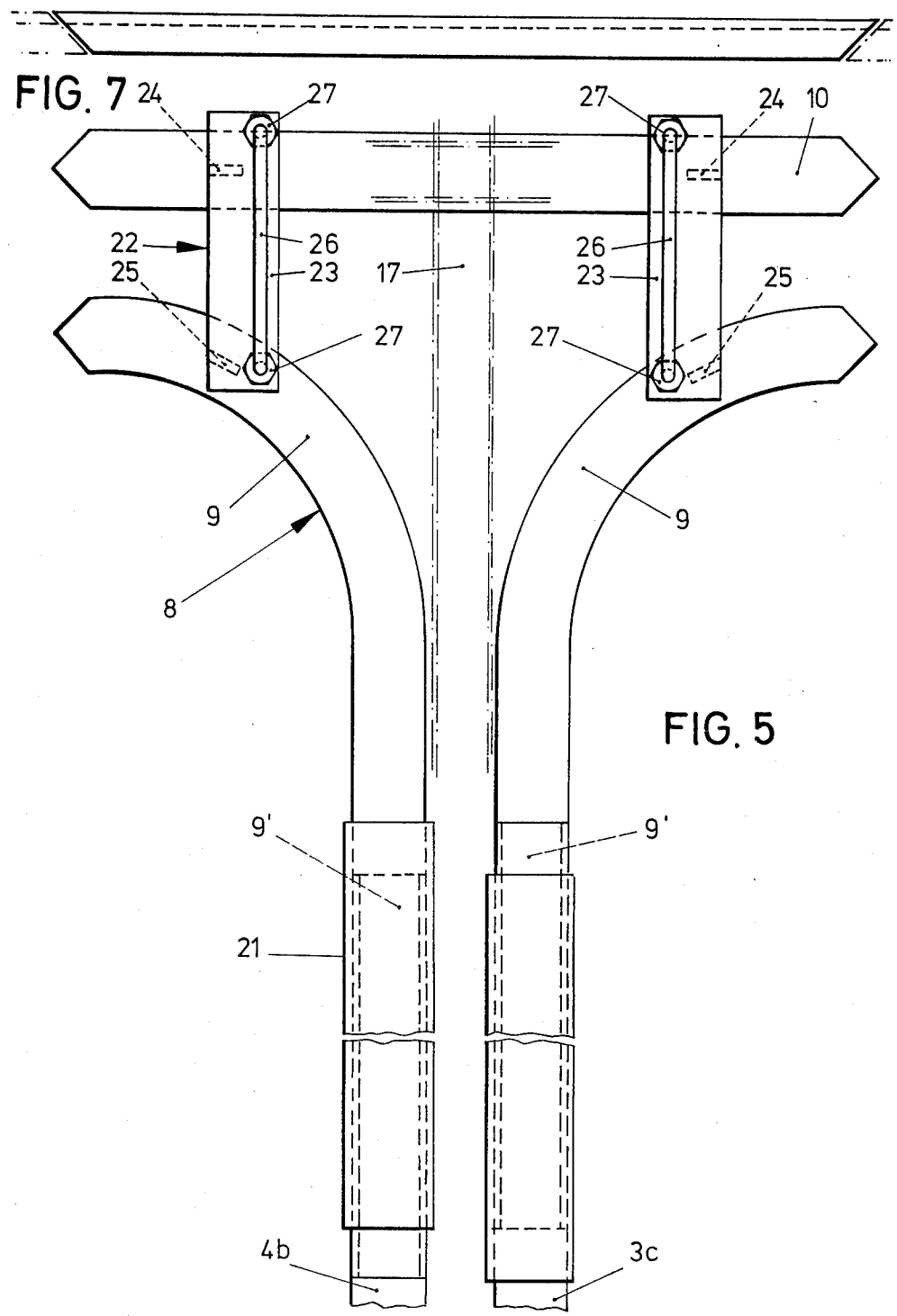

CONVEYOR APPARATUS FOR INTRAPLANT CONVEYANCE

This invention relates to an overhead conveyor apparatus for intraplant conveyance along a rail system including work station loops individually approachable via feeder rails.

A conveyor apparatus of the above named type is designed to convey objects to be serially processed to a work station and subsequently away therefrom. The provision of work station loops permits the storage of a plurality of the objects prior to processing and subsequent thereto, so that the object may be supplied and returned in groups. The configuration of the loops provides for separate rails for the objects to be supplied and those to be returned, so as to avoid any interference. A conveyor system of this type has been very successfully employed for instance in the garment industry, where each work station includes a sewing machine and its accessories. In a known conveyor system of this type, the transfer between work station loops is accomplished by means of a shiftable transfer rail carrier. The transfer rail carrier may be located between opposite feeder and return rails of individual work stations, so that its rails form a connection between said feeder and return rails permitting direct transfer of the objects to be processed. In addition, the transfer rail carrier itself may serve as a conveying means e.g. by being connected to one work station loop for receiving the goods to be conveyed therefrom, and by being subsequently shifted to a further work station loop for supplying the conveyed goods thereto. In a conveyor system including a great number of work stations it is thus necessary either to wait with the further conveyance of the goods until the transfer rail carrier is empty, or to provide a number of transfer rail carriers corresponding to the number of work stations, in which case it may become necessary to provide bypass points permitting the transfer rail carriers to pass one another, In a conveyor system of this type it is further known to dispose the work stations adjacent one another, so that their feeder and return rails extend at a close spacing parallel to one another, permitting the carriages carrying the conveyed objects to be lifted off one rail and to be transferred to the feeder rail of the next work station loop. This procedure may require considerable time, however, resulting in economical drawbacks, particularly in the case of great numbers of objects to be conveyed. Furthermore, errors in the selection of the proper rails may result in producton holdups. The possibility of such errors becomes particularly acute if the sequence of operations is frequently altered for different goods, i.e. if the sequence of the work stations to be supplied is frequently changed. It is further known already to provide a by-pass loop encompassing a plurality of work station loops and having its own feeder and return rails without being connected to the work station loops, however. The conveyed goods therefore have to be transferred manually from the work station loops to the bypass loops, which is again time consuming. There is further the danger that groups of the conveyed goods carried on the bypass loop interfere with one another and/or are confused with one another. In addition, the bypass loop requires additional space and structural expenditure.

It is an object of the invention to improve by simple means a conveyor apparatus of the type set forth in the introduction so that it may be readily adapted to varying production sequences while ensuring a smooth production procedure.

In order to attain this object, the invention provides that two or more work station loops are adapted to be directly interconnected by means of switches and/or bridging sections to form a work section loop.

The conveyor apparatus designed as stated above permits the conveyed goods to be quickly and readily transferred fron one work station to another. In addition, it is very flexible and may be readily adapted to the requirements of any production sequence. If desired, two or more adjacent work station loops arranged in accordance with the consecutive production steps for a given product may remain directly interconnected during the entire production program if each product is to be conveyed further by itself. This may be the case, for instance, if the processing times at each work station are substantially equal, this permitting a kind of assembly-line process. By appropriate positioning of the switches it is also possible, however, to disconnect each work station loop individually, until a supplied number of objects has been completely processed, whereupon the switches may be repositioned to tranfer the entire group to the next work station. The number of the work stations to be sequentially interconnected in this manner may also be selected in accordance with any given production program, depending only on the suitable coordination of the work station loops. This flexible layout of the conveying path offers considerable advantages in all cases of frequently varying production sequences such as in the garment industry. The saving in transfer time is considerable. The additional structural expenditure required for switches and bridging sections is at least partially compensated by a reduction of the number of transfer rail carriers, as these are only required for servicing groups of work stations, i.e. work sections.

Each work station loop may be connected in a simple manner to the feeder rails of an adjacent work station loop by means of a switch and/or a bridging section. This results in a sequential interconnection of the conveying path along individual work station loops, wherein each work station loop is traversed by the conveyed goods in the same direction as in the case of direct supply. This is of particular advantage with regard to the process sequence, since the work stations, such as sewing machines, are disposed at a stationary location with respect to the conveyor apparatus, so that the respective operator does not have to alter his routine. Moreover the connecting paths are formed by employing to a large extent rail sections which are required in any case.

In the case of a conveyor apparatus including a bypass loop around a plurality of work stations, sections of adjacent work station loops may be directly interconnected by means of switches and/or bridging sections to form a continuous bypass loop for a work station group consisting of two or more work stations. The direct connection of one section of one work station with one section of an adjacent work station may be formed as the only direct connection between the two work station loops. In this case, the conveyed goods will not pass along a portion of the second work station loop, while the overall conveying direction remains unchanged. This arrangement offers the additional possibility to bypass a work station along a section of its loop, i.e. to directly interconnect a "first" and a "third"

work station. In a particularly advantageous manner, however, the direct connection of work station loop sections may be provided in addition to the connection of each work station loop with the next loop via the feeder rail thereof. This permits the conveying path and thus the process sequence to be varied in numerous ways. Thus a selected work station, at which a great number of workpieces are processed within a short period, may be connected to supply two subsequent work stations whereat further processing of the workpieces requires a longer time. In this case, the adjacent work station loop is supplied via its feeder rail, while the more remote loop is approached via the bypass loop. Furthermore in the case of a group of work stations equipped with different special machines, it is possible to select any combination of conveying paths, e.g. the sequence 1, 3, 4, 6; or 1, 3, 2, 4, 5, 6; etc. This is because the bypass loop permits the workpieces to be conveyed back to a previously bypassed work station.

The connection between the work station loops, or between a work station loop and a rectilinear rail section leading to the next work station loop, respectively, may be accomplished by displaceable arcuate bridging sections. These sections form a portion of the rail track in any position. They are of particularly simple construction, since they do not have to be suspended from a carrier structure and may be readily rearranged by hand. At connection points whereat a continuous rectilinear rail track or, alternatively, a branch connection is to be established, the connection may be formed by means of sliding or hinged switches each comprising at least one rectilinear rail section and an arcuate section connected thereto. In this case, the carrier structure of the conveyor apparatus has to be provided with retention means for retaining in proper position the section of the switch not used in the given position thereof.

Further details of the invention will become evident from the following description of exemplary embodiments of conveyor apparatus according to the invention.

Figure 6:
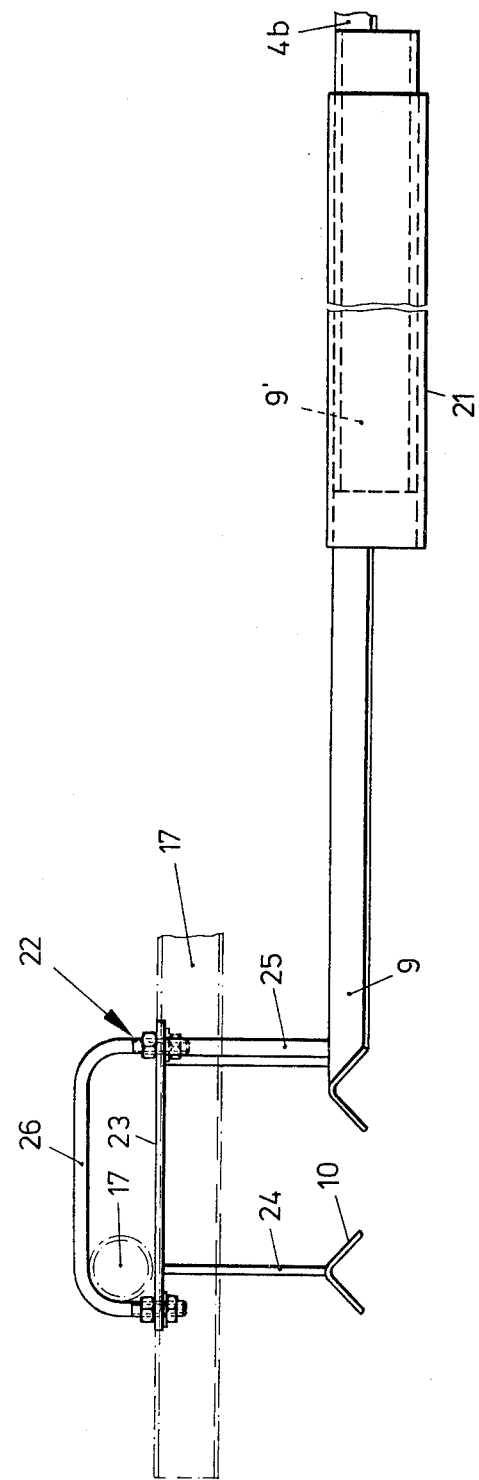
Figure 9:
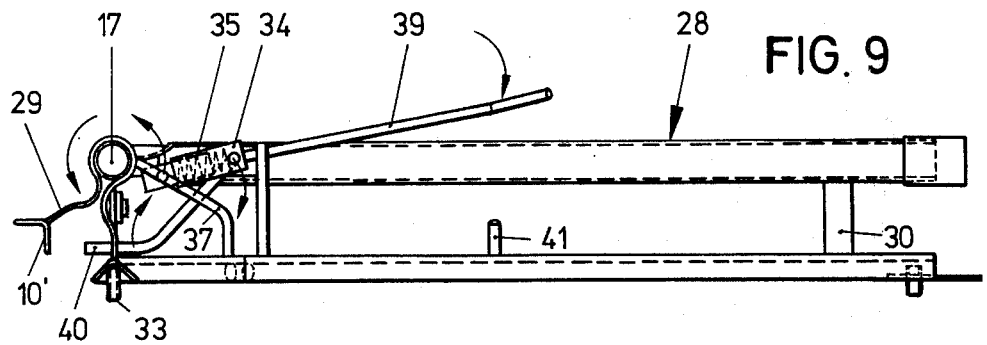
Figure 8:
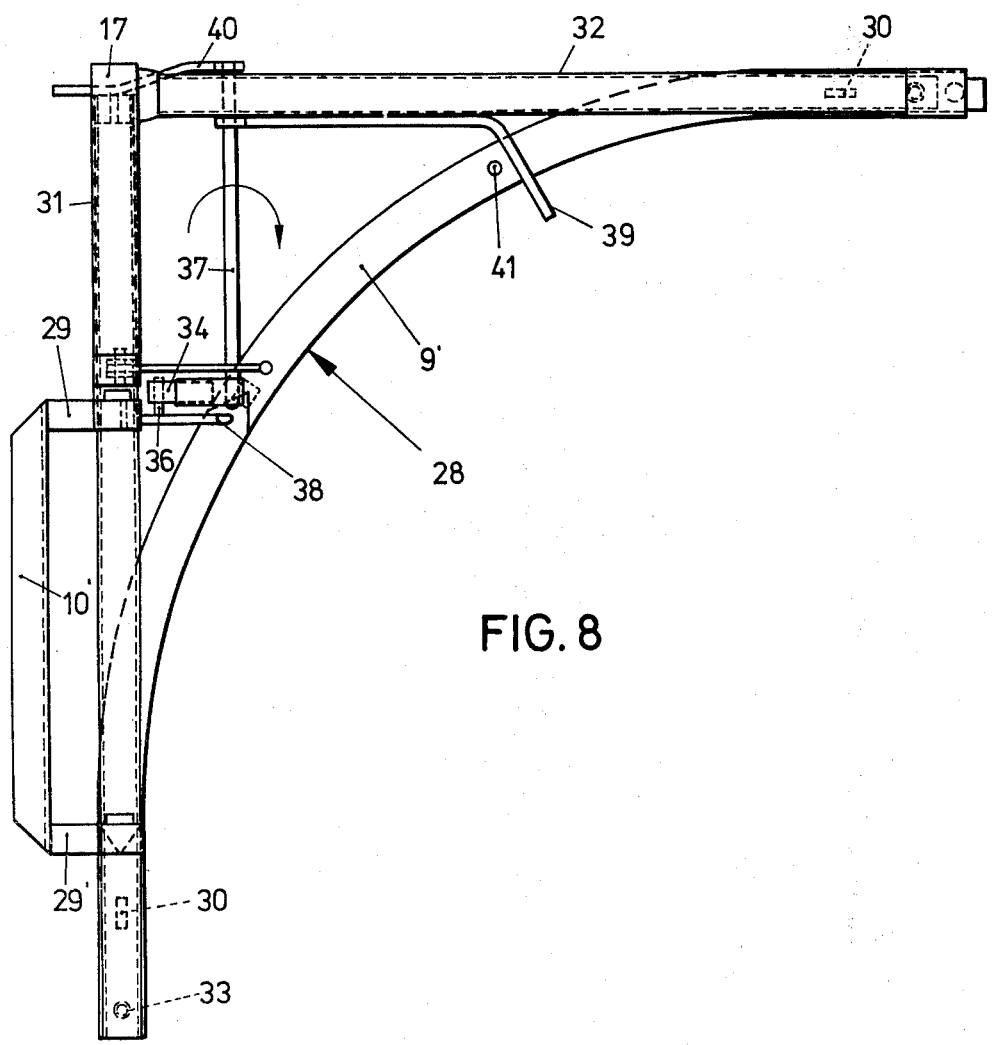

In the drawings:

FIG. 1 shows a diagrammatic top plan view of a conveyor arrangement for six work stations, FIG. 2 shows a top plan view of a rail connection employing a displaceable arcuate bridging section, FIG. 3 shows an elevational side view of FIG. 2, FIG. 4 shows a detail of FIG. 3, FIG. 5 shows a top plan view of a double sliding switch, FIG. 6 shows an elevational side view of the switch shown in FIG. 5, FIG. 7 shows a diagrammatic end view of the rail track connection established with the switch of FIG. 5, FIG. 8 shows a top plan view of a hinged switch, and FIG. 9 shows an elevational side view of the hinged switch.

FIG. 1 shows a portion of an intraplant overhead conveyor apparatus in the form of a rail arrangement for servicing six work stations 1 to 1e. As for instance in the garment industry, the work stations may each comprise a sewing machine or an ironing table. The work stations are arranged in two parallel rows of three consecutive work stations each. Each work station is surrounded by a rail track forming a work station loop generally designated 2 to 2e, respectively. Each loop 2 commences at a feeder rail 3 and ends at a return rail 4. All feeder and return rails extend parallel to one another. Their respective free ends are arranged side by side in a terminal zone for connection to other portions of the conveyor apparatus. In accordance with the overall plant layout, this connection may be of a permanent nature, or it may be selectively established as by means of switches or a movable rail carrier.

The work station loops are disposed on both sides of the parallel arrangement of feeder and return rails in such a manner that one side of each rectangular loop is formed by a respective feeder or return rail. The designations feeder rails and return rails relate to the main conveying direction indicated by arrows in FIG. 1 and passing around each work station in clockwise direction. Preferably movement of goods always takes place in the same direction along any given section of rail, as indicated by the arrow on that rail section, and on feeder rails 3–3e movement is always away from the terminal zone while on return rails 4–4e it is always toward the terminal zone. The conveying direction and thus the function of a rail section as a feeder or return rail may of course be selected in any manner. The work station loops 1, 1a and 1b on the lefthand side of FIG. 1 each comprise a rail section 5 connected to the feeder rail 3 and extending perpendicular thereto, an outer section 6 extending parallel to the feeder rail 3, and a rail section 7 extending parallel to rail section 5 and connected to the return rail 4 leading back to the terminal zone. Similarly, one side of the work station loops 1c, 1d, 1e on the righthand side of FIG. 1 is formed by a portion of the respective feeder rail 3, the succeeding rail sections in the main conveying direction being designated 5, 6 and 7, respectively, with the corresponding alphabetical index, and each section 7 connecting to the associated return rail 4. The rail sections of each loop are arranged perpendicular to one another and interconnected by means of arcuate connecting members, some of these members being non-releasable, i.e. intergally connected to the rail sections, and others being releasable.

The work station loops of the work station group shown in FIG. 1 are provided with different embodiments of the releasable connections between their rail sections. Between outer section 6 and rail section 7 of work station loop 2, there is provided a single-side sliding switch 8 comprising an arcuate rail section 9 and a rectilinear rail section 10. The connection between rail section 7 and return rail 4 is formed by a releasable arcuate section or bridging member 11.

In work station loop 2a, rail section 5a is connected to outer section 6a, and the latter to rail section 7a by means of sliding switches 8, while rail section 7a is connected to return rail 4a by means of a releasable bridging section 11.

In work station loop 2b, rail section 5b is connected to outer section 6b by means of a sliding switch 8, while rail sections 6b and 7b are integrally connected to one another. The connection between rail section 7b and return rail 4b is formed by arcuate section 9 of a double-side sliding switch 8', the second arcuate section 9 of which is disposed in mirror-image relationship to first section 9 and serves to interconnect rail section 5c of work station loop 2c with the associated feeder rail 3c. A sliding switch 8 connects outer section 6c of work station loop 2c to rail section 7c, which is itself integrally connected to return rail 4c. In work station loop 2d, the connection between feeder rail 3d and rail section 5d is formed by a displaceable bridging section 11 of arcuate shape, while rail sections 5d and 7d are connected to outer section 6d by means of sliding switches 8. The connection between rail section 7d and return rail 4d is non-releasable. Work station loop 1e comprises a displaceable arcuate bridging section 11 between feeder rail 3e and rail section 5e, and a sliding switch 8 between rail section 5e and outer section 6e, the other connections being non-releasable.

Adjacent the locations for arcuate bridging sections 11, feeder rails 3 and return rails 4 are each provided with upwards pivotable straight bridging inserts 12. Between each pair of aligned outer rail sections 6 there is provided a two-ended straight bridging section 13.

The portion of a conveyor apparatus depicted in FIG. 1 permits the following conveying paths to be established to the individual work station loops:

(1) Each work station loop may be approached directly via the associated feeder rail 3, as exemplified by work station loop 2, with the conveyed goods being withdrawn via associated return line 4 after processing at work station 1.

Work station loops 2a to 2e are arranged to directly convey the goods from one work station to the next. Work station loop 2a is directly supplied via feeder rail 3a. The conveyed goods travel to rail section 7a via the arcuate sections 9 of switches 8. The associated arcuate bridging section 11 is displaced from the position of the respective member 11 in loop 2 so as to connect rail section 7a to feeder rail 3b. Direct supply via feeder rail 3b is prevented in this case by tilting bridging insert 12 upwards. In this position, arcuate bridging section 11 permits the goods to pass directly from rail section 7a to work station 2b and therearound. Rail section 7b is directly connected to rail section 5c of work station loop 2c via the straight rail section 10 of double-side switch 8', so that the conveyed goods may also pass directly to this work station loop, i.e. to work station 1c.

On the righthand side of FIG. 1, outer rail sections 6, bridging sections 13 and rectilinear rail sections 10 of switches 8 are interconnected to form a continuous outer rail track leading directly to return rail 4e via rail section 7e. In this configuration, work stations 1c, 1d and 1e are bypassed by the conveyed goods moving along the thus established continuous rail track. If the switches 8 on the lefthand side of FIG. 1, i.e. between work stations 1, 1a and 1b are adjusted in the same manner, there results a bypass loop extending around the entire work station group from feeder rail 3 to return rail 4e. This bypass loop permits any work station within the group to be rapidly connected to any other work station loop thereof, even if it is not immediately adjacent thereto. The rectilinear bridging sections 13 between any two adjacent work station loops may also be employed for storing the goods to be conveyed, in which case the respective working stations are supplied via the associated arcuate bridging sections 11.

FIGS. 2 to 4 show an arcuate bridging section 11 with the associated components. The position taken by bridging section 11 for interconnecting adjacent sections of a work station loop, for instance rail section 7 and return rail 4 of work station loop 2 in FIG. 1, is depicted in solid lines in FIG. 2. The dash-dot lines in FIG. 2 show the arcuate bridging section in its other operative position for connecting the same end of rail section 7 to feeder rail 3a. Bridging section 11 has an angular cross-section profile that is rounded at its top and conforms to the rail cross-section profile of the conveyor system at least adjacent the terminal ends. For improved support on the rails to be connected, the leg portions of the profile are formed with bevelled end faces so as to form a pointed end on the bridging section in top plan view. Adjacent each pointed end the upper edge bridging section is formed with a bore 14 for receiving therein the end of an angled bolt 15 projecting beyond the end of the rails to be interconnected, so as to secure bridging section 11 in position. Attached to the top surface of arcuate bridging section 11 is an angled grip member 16 having one leg projecting vertically above the apex of the angular profile, and a second leg extending at an angle of 90° thereto in such a manner that it is supported on a horizontal carrier member 17 of the rail system in both operating positions of the bridging section 11. Attached to the same carrier member 17 by means of a threaded connection 18 is a spring clamp 19 shown in FIG. 4 on an enlarged scale.

For altering the conveying path, rectilinear bridging section 12 of feeder rail 3a is pivoted upwards about a hinge 20 to the raised position shown in phantom lines in FIG. 3. In this position, section 12 is engaged by spring clamp 19 to be retained thereby as shown in FIG. 4. Subsequently arcuate bridging member 11 is lifted up out of its position shown in solid lines in FIG. 2 and is brought to the position shown in dash-dot lines in FIG. 2, with the angled grip member 16 serving as a handle. The rectilinear section 12 in its raised position serves as a safety device stopping any conveyed goods erroneously supplied via feeder rail 3a.

FIGS. 5 to 7 show a double-side sliding switch 8' as employed in FIG. 1 for interconnecting work station loops 2b and 2c with one another or with the associated feeder and return lines, respectively. The double-side sliding switch 8' is essentially a mirror-image arrangement of two single-side sliding switches, so that a description of the latter is not required.

Double-side sliding switch 8' comprises two arcuate shiftable rail sections 9 having an angular cross-sectional shape with rounded apex. The rectilinear shiftable rail section 10 has the same profile. Each arcuate section 9 has an arcuate portion and a rectilinear portion leading over to a tubular end portion 9'. Similarly shaped end portions are provided at adjacent fixed rail sections, in the present case feeder rail 3c and return rail 4b. A tubular member 21 surrounding both tubular end portions serves to support the arcuate section on the adjacent fixed rail section and functions simultaneously as the slide bearing. The arcuate portion of each arcuate rail section 9 is connected to shiftable rectilinear rail section 10 through a bridge member generally designated 22. Bridge member 22 simultaneously functions to support this end of the sliding switch on the horizontal carrier member 17 of the rail system as shown in FIG. 6. Bridge member 22 comprises a support plate 23 connected to the shiftable rectilinear rail section 10 by means of a vertical leg 24, and to arcuate shiftable section 9 by means of a similar leg 25. A U-shaped bracket 26 is attached to support plate 23 by means of threaded connections 27 provided at both of its ends. Bracket 26 is dimensioned to receive tubular carrier member 17 between it and support plate 23, so that the bridge member and thus the switch is supported thereon. The length of bracket 26 permits the switch to be shifted perpendicularly to the carrier member. As shown in FIG. 1, the switch is adapted to be shifted between two operating positions for establishing rail track connections either by means of its arcuate sections or by means of its rectilinear section. FIG. 7 shows the engagement of the rectilinear section 10 with the bevelled ends of the fixed rectilinear rail sections to be interconnected.

FIGS. 8 and 9 show a hinged switch 28 which may be alernatively employed in place of the sliding switch or the arcuate bridging section. Hinged switch 28 has a rectilinear shiftable rail section 10' and an arcuate shiftable rail section 9' attached by means of legs 29 and 30, respectively, to a pair of tubular supports 31, 32 interconnected at right angles with respect to one another. Tubular support 31 is rotatably mounted on a tubular carrier member 17 of the conveying apparatus. Rectilinear section 10' or arcuate section 9' may be selectively adjusted to the operative position by rotating tubular support 31 about an angle of substantialy 45°. FIGS. 8 and 9 show arcuate section 9' in its operative position, in which pin members 33 projecting adjacent the end portions thereof are engaged with recesses in the rail sections to be interconnected. A spring cylinder 34 containing a compression spring 35 has one of its end portions rotatably mounted on a stud 36, its other end portion being connected to a rod 37. Stud 36 projects perpendicular from an angled rod member 38 supported by tubular support 31 adjacent leg 29 so as to pivot upwards when rectilinear rail section 10' is lowered. Rod 37 has its other end rotatably mounted in tubular support 32 and carries a pair of stopper arms 39, 40 disposed on either side of support 32. In the position shown in FIGS. 8 and 9, stopper arm 40 overlies a (not shown) rectilinear fixed rail section with which rectilinear switch rail section 10' is aligned when in its operative position. The other stopper arm 39 performs no function in this position. Pivoting of rectilinear section 10' downwards to its operative position causes shiftable arcuate section 9' to be raised and rod 37 to be rotated, whereby stopper arm 40 is raised to open the newly established straight through rail track connection, while the other stopper arm 39 is lowered so that its angled end portion overlies the fixed arcuate section 9" in close proximity to an abutment peg 41 projecting above its upper edge. Peg 41 prevents bending of stopper arm 39 in case of erroneously directed conveyed goods impinging forcefully thereon.

The invention is not restricted to the embodiments shown and described. The arrangement of work stations diagrammatically shown in FIG. 1 together with the associated work station loops may be varied in any manner. There may thus be a smaller or greater number of work stations to be supplied via a common rail terminal section. The formation of a bypass loop is also possible in this case. In accordance with the overall plant layout the invention also provides the possibility to interconnect work station loops either only via the associated feeder and return rails, or only directly via a continuous bypass loop. It is further possible to connect a bypass loop as shown in FIG. 1 to identical or similar bypass loops of adjacent work station groups.

The described arcuate bridging sections and switch arrangements have been found very advantageous. Within the scope of the invention, however, other types and configurations of switches may also be employed for interconnecting the work station loops. In particular, the arcuate bridging members between the feeder and return rails and the work station loops may be replaced by switches, for instance hinged switches.

I claim:

1. A rail system for conveying goods within a plant or the like in which there are at least two work stations, said rail system being of the type having a feeder rail for each of said at least two work stations, each feeder rail extending from a terminal zone towards its work station, and a return rail for each of said at least two work stations, each return rail extending from its work station to said terminal zone, said rail system being characterized by:
   A. a pair of rail loops, one for each of said at least two work stations, each rail loop comprising rail arranged as
      (1) a first segment having an entry end connectable with the feeder rail for the work station and having a departure end,
      (2) a second segment which is spaced from the first segment and which has a departure end connectable with the return rail for the work station and an entry end, and
      (3) a third segment having an entry end connectable with the departure end of said first segment and a departure end connectable with the entry end of said second segment;
   B. a bypass rail segment having an entry end adjacent to the departure end of the third segment of one of said rail loops and a departure end adjacent to the entry end of the third segment of the other of said rail loops;
   C. said one rail loop having shiftable rail means at the departure end of its third segment for connecting said third segment alternatively and selectably with the second segment of said one rail loop and with the entry end of said bypass segment; and
   D. said other rail loop having shiftable rail means adjacent to the entry end of its third segment for connecting the same alternatively and selectably with the departure end of said bypass segment and with the departure end of its first segment.

2. The rail system of claim 1, further characterized by:
   E. said one rail loop having further shiftable rail means adjacent to the departure end of its second segment for connecting the same alternatively and selectably with its return rail and with the entry end of the first segment of said other rail loop.

3. The rail system of claim 2 wherein the return rail for said other rail loop has a portion which is near the departure end of the second segment of said one rail loop and wherein said further shiftable rail means is arranged to connect said second segment of said one rail loop with said first segment of said other rail loop by way of said portion of that return rail.

4. A rail system for conveying goods within a plant or the like in which there are at least two work stations, said rail system being of the type having at least two rail loops, one for each of said at least two work stations, a feeder rail for each of said rail loops extending towards its rail loop from a terminal zone, and a return rail for each of said rail loops extending from its rail loop to said terminal zone, said rail system being characterized by:
   A. a bypass rail segment extending from one to the other of said at least two rail loops and having its ends substantially spaced from both the feeder rail and the return rail for each of said loops; and
   B. shiftable rail means at each end of said bypass rail segment for alternatively and selectably enabling goods to move around substantially the whole of each rail loop or enabling goods which have been moved around only a part of said one rail loop to be moved directly to said other rail loop for movement around a part of the latter.

* * * * *